United States Patent
Russo

Patent Number: 5,791,064
Date of Patent: Aug. 11, 1998

[54] BAR FOR DRYING PASTA

[75] Inventor: Pietro Russo, Winterthur, Switzerland

[73] Assignee: Nestec S.A., Vevey, Switzerland

[21] Appl. No.: 798,307

[22] Filed: Feb. 7, 1997

[30] Foreign Application Priority Data

Feb. 9, 1996 [CH] Switzerland ............... 338/96

[51] Int. Cl.⁶ .................................. F26B 19/00
[52] U.S. Cl. ............... 34/90; 34/103; 34/104; 34/107; 34/239
[58] Field of Search ................. 34/90, 103, 104, 34/107, 239, 240, 437, 440, 442; 294/19.1, 2.5, 5.5; 52/740.3, 740.4; 7/76, 388; 211/113, 123

[56] References Cited

U.S. PATENT DOCUMENTS

| | | | |
|---|---|---|---|
| 1,801,452 | 4/1931 | Parkes | 34/240 |
| 2,014,523 | 9/1935 | Dunham | 211/123 X |
| 2,439,115 | 4/1948 | Viviano | 34/240 |
| 3,125,038 | 3/1964 | Amato | 34/240 |
| 5,355,592 | 10/1994 | Pardini | 34/239 X |
| 5,647,492 | 7/1997 | Fillios et al. | 211/123 |

FOREIGN PATENT DOCUMENTS

| | | |
|---|---|---|
| 0385088 | 1/1990 | European Pat. Off. |
| 2493107 | 5/1982 | France |

OTHER PUBLICATIONS

Derwent Abstract, WPI Accession No. 82–50626 E/25 and XRAM Accession No. C82—E50626 of Bertozzi French Patent Application Publication No. 2 493 107 (1982).

*Primary Examiner*—Henry A. Bennett
*Assistant Examiner*—Steve Gravini
*Attorney, Agent, or Firm*—Vogt & O'Donnell, LLP

[57] ABSTRACT

Hanging bar for drying long lengths of pasta, having in cross-section a profile which narrows from the top down, and the surface of which has a raised pattern with a repeating motif such that the lengths of pasta rest on several successive asperities of the pattern along their bent-over part in contact with the bar.

9 Claims, 2 Drawing Sheets

BAR FOR DRYING PASTA

BACKGROUND OF THE INVENTION

The subject of the present invention is a hanging bar for drying long lengths of pasta, having in cross-section a profile which narrows from the top down.

In order to dry long lengths of pasta, such as spaghetti, on an industrial scale it is possible to cut freshly-made pasta, such as that leaving a press, to the desired length and to hang the lengths of pasta folded over or bent around drying bars which are made to travel in a dryer by catching hold of their ends with suspension hooks having lateral driving chains, the bent-over part of the lengths of pasta being cut off and separated at the exit of the dryer, for example.

In order to avoid the lengths of pasta adhering to these bars, they may be made of anodized aluminium or of stainless steel, for example. However this solution to the sticking problem is not entirely satisfactory insofar as it must nevertheless be accompanied by other measures such as frequently washing the bars and/or coating them with a film of oil.

FR 2493107 (BARILLA) proposes replacing the solution using bars made of anodized aluminium with another solution which is apparently more economical but which is not entirely satisfactory either, namely by using bars covered with a removable polypropylene sheath.

Furthermore, bars are known, from EP 0385088 (BARILLA), the top of whose cross-sectional profile is flattened so as to decrease the length over which the pasta is in contact with the bar compared to a corresponding bar the top of whose profile has the form of a circular arc.

SUMMARY OF THE INVENTION

The object of the present invention is to propose a more satisfactory solution to the problem of long lengths of pasta sticking to the drying bars which makes it possible to dispense with cleaning these bars too frequently as well as with any coating of oil, while still allowing recycling, in pasta manufacture, of the bent-over pieces of pasta cut off at the exit of the dryer.

For this purpose, the hanging bar for drying long lengths of pasta according to the present invention is distinguished in that its surface has a raised pattern with a repeating motif such that the lengths of pasta rest on several successive asperities of the pattern along their bent-over part in contact with the bar.

This is because it has been found that such a bar makes it possible effectively to space out the cleaning operations, to dispense with the coating of oil, which long term may cause undesirable blackening of the lengths of pasta, and to recycle perfectly clean bent-over pieces in the pasta manufacture, after having reduced them to a powder rather than throwing them away.

DETAILED DESCRIPTION OF THE INVENTION

In a first preferred embodiment of the present invention, the said repeating motif is in the form of the mesh cells of a mesh.

In this first preferred embodiment, the bar may be made in the form of a duly folded and profiled aluminium or stainless-steel sheet covered with a metal trellis, for example.

In a second preferred embodiment, the said repeating motif may be in the form of rounded bumps lying between the mesh cells of a double network of lines which intersect on the surface of the bar, or in the form of rows of bumps having mutually overlapping bases, or in the form of grooves alternating with peaks, or in the form of rounded hollows lying between the mesh cells of a double network of lines which intersect on the surface of the bar, or else in the form of rows of hollows having mutually overlapping edges, for example.

In this second preferred embodiment, the bar may be made of an aluminium, especially anodized or lacquered aluminium, sheet or stainless-steel sheet, the sheet being goffered, embossed and/or corrugated, cut out into the form of an elongate rectangle, folded longitudinally on itself so as to produce, in cross-section, a profile with the top rounded and with the straight sides coming closer together from the top down, before being folded towards each other and joined together by a weld at the base, for example.

It is possible, in particular, to start from commercially available goffered, embossed and/or corrugated sheets, such as stainless-steel sheets of the Monster AN2, AN5 or AN6 type from the company AVESTA, Sheffield, England and represented by the firm KOHLER, Zurich, Switzerland, or aluminium sheets of the "Dessinalblech gestreift" type from the company ALLEGA, Zurich, Switzerland, for example.

The hanging bar for drying long lengths of pasta according to the present invention is described in more detail hereinbelow with reference to the appended drawing Figures which represents a few embodiments, in which:

BRIEF DESCRIPTION OF THE DRAWING FIGURES

DETAILED DESCRIPTION OF THE DRAWING FIGURES

Figure 1:
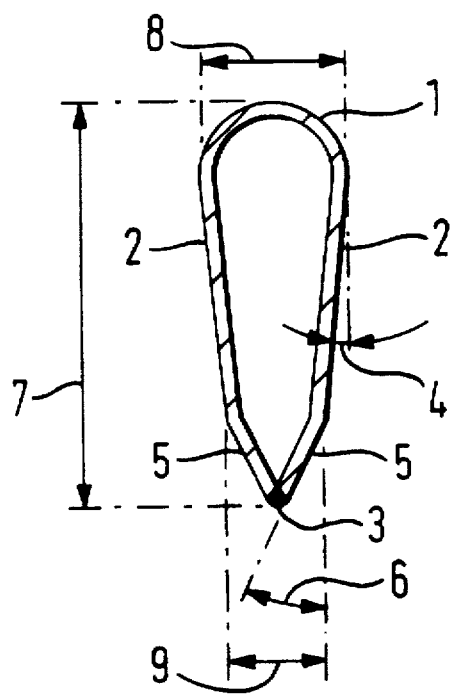
FIG. 1 depicts a cross-sectional view of a preferred embodiment of the bar.
Figure 2:
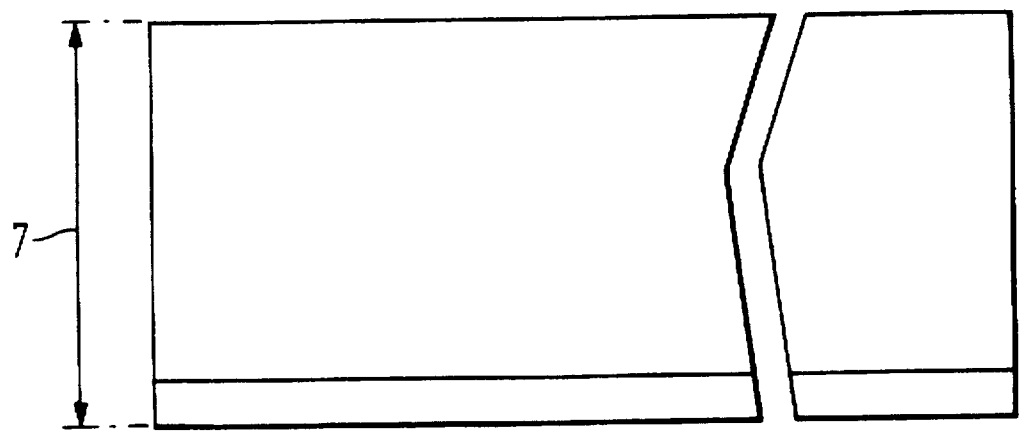
FIG. 2 is a diagrammatic side view of the embodiment of the bar depicted in FIG. 1.

As may be seen in FIG. 1, the bar has in cross-section a profile which narrows from the top down.

In the embodiment depicted, the bar is made of goffered, embossed and/or corrugated aluminium or stainless-steel sheet. In cross-section, it has a profile with the top 1 rounded in the form of a semicircle and with the straight sides 2 coming closer together from the top down or being folded towards each other and joined together by a weld at the base 3.

The plane surface of each side 2 makes an angle 4 of 5.5° with a vertical plane parallel to the bar.

The folded part 5 of the base of each side makes an angle 6 of 25° with a vertical plane parallel to the bar.

The bar has a height 7 of 45 mm, a thickness 8 of 16 mm at the top and a thickness 9 of 11 mm in the region of the fold at the bottom of the sides.

Figure 3:
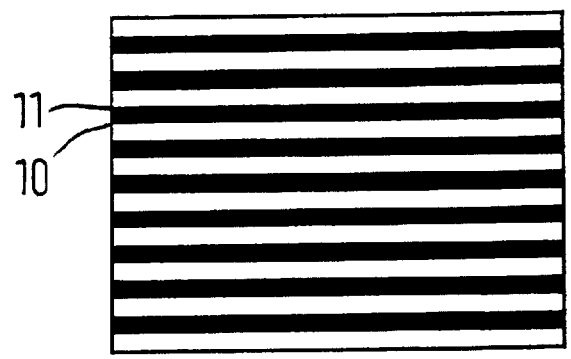
FIG. 3 is a view of the surface of the side of the bar depicted in FIG. 1, showing one embodiment of the repeating motif which the surface of the bar may have in relief.
Figure 4:
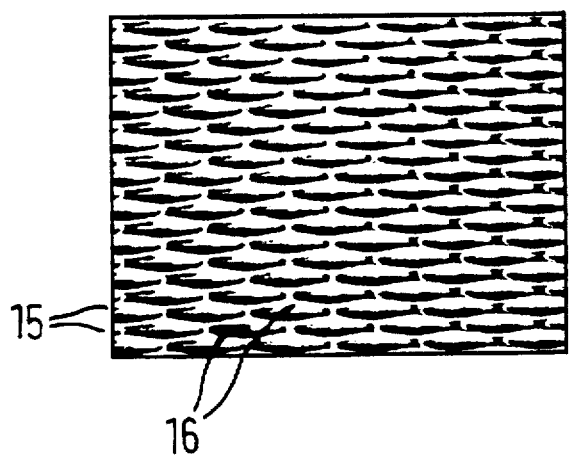
FIG. 4 is a view of the surface of the side of the bar depicted in FIG. 1, showing another embodiment of the repeating motif which the surface of the bar may have in relief.
Figure 5:
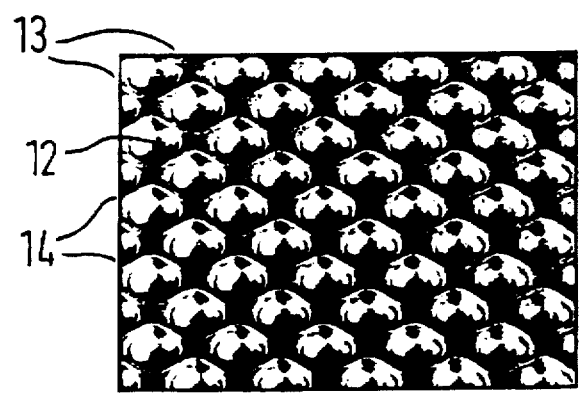
FIG. 5 is a view of the surface of the side of the bar depicted in FIG. 1, showing yet another embodiment of the repeating motif which the surface of the bar may have in relief.

As may be seen in FIGS. 3, 4 and 5, the surface of the bar has a raised pattern with a repeating motif so that the lengths of pasta rest on several successive asperities of the pattern along their bent-over part in contact with the bar.

In its embodiment depicted in FIG. 3, the repeating motif which the surface of the bar may have in relief is in the form of grooves 10 alternating with peaks 11 (aluminium sheet of the "Dessinalblech gestreift" type from the company ALLEGA).

In its embodiment depicted in FIG. 4, the repeating motif is in the form of rows 15 of bumps 16 having mutually overlapping bases (stainless-steel sheet of the Monster type from the company AVESTA).

In its embodiment depicted in FIG. 5, the repeating motif is in the form of rounded bumps 12 lying between the mesh cells of a double network of lines 13, 14 which intersect on the surface of the bar (stainless-steel sheet of the Monster AN6 type from the company AVESTA).

I claim:

1. Hanging bar for drying long lengths of pasta, having in cross-section a profile which narrows from the top down, characterized in that its surface has a raised pattern with a repeating motif such that the lengths of pasta rest on several successive asperities of the pattern along their bent-over part in contact with the bar.

2. Bar according to claim 1, characterized in that the said repeating motif is in the form of the mesh cells of a mesh.

3. Bar according to claim 1, characterized in that the said repeating motif is in the form of rounded bumps lying between mesh cells of a double network of lines which intersect on the surface of the bar.

4. Bar according to claim 1, characterized in that the said repeating motif is in the form of rows of bumps having mutually overlapping bases.

5. Bar according to claim 1, characterized in that the said repeating motif is in the form of grooves alternating with peaks.

6. Bar according to claim 1, characterized in that the said repeating motif is in the form of rounded hollows lying between mesh cells of a double network of lines which intersect on the surface of the bar.

7. Bar according to claim 1, characterized in that the said repeating motif is in the form of rows of hollows having mutually overlapping edges.

8. Bar according to claim 2, made in the form of a duly profiled sheet covered with a metal trellis.

9. Bar according to claim 1, made of goffered, embossed and/or corrugated aluminium sheet or stainless-steel sheet, the sheet being cut out in the form of an elongate rectangle, folded longitudinally on itself so as to produce, in cross-section, a profile with the top rounded and with the straight sides coming closer together from the top down before being folded towards each other and joined together by a weld at the base.

* * * * *